(12) United States Patent
Williams (10) Patent No.: US 8,519,673 B2
(45) Date of Patent: Aug. 27, 2013

(54) ARBITRATING BATTERY POWER CALIBRATION IN A DEVICE THAT SELECTS A BATTERY POWER UNIT FROM A PURALITY OF SELECTABLE BATTERY POWER UNITS

(75) Inventor: Jeffrey A. Williams, Colorado Springs, CO (US)

(73) Assignee: Seagate Technology LLC, Cupertino, CA (US)

( * ) Notice: Subject to any disclaimer, the term of this patent is extended or adjusted under 35 U.S.C. 154(b) by 1209 days.

(21) Appl. No.: 11/479,420

(22) Filed: Jun. 30, 2006

(65) Prior Publication Data
US 2008/0007219 A1   Jan. 10, 2008

(51) Int. Cl.
*H02J 7/00*   (2006.01)

(52) U.S. Cl.
USPC .......................................... 320/132

(58) Field of Classification Search
USPC ................... 320/131, 132; 324/433; 327/19; 713/340
See application file for complete search history.

(56) References Cited

U.S. PATENT DOCUMENTS

| | | | |
|---|---|---|---|
| 4,151,454 A | 4/1979 | Iida | |
| 4,193,026 A | 3/1980 | Finger et al. | |
| 4,390,841 A | 6/1983 | Martin et al. | |
| 5,284,719 A | 2/1994 | Landau et al. | |
| 5,717,937 A | 2/1998 | Fritz | |
| 5,838,171 A | 11/1998 | Davis | |
| 5,898,880 A | 4/1999 | Ryu | |
| 5,986,435 A | 11/1999 | Koenck | |
| 6,043,630 A | 3/2000 | Koenck et al. | |
| 6,104,967 A | 8/2000 | Hagen et al. | |
| 6,307,349 B1 | 10/2001 | Koenck et al. | |
| 6,377,028 B1 | 4/2002 | Armstrong, II et al. | |
| 6,463,545 B1 * | 10/2002 | Fisher et al. | 713/340 |
| 6,529,840 B1 | 3/2003 | Hing | |
| 6,630,814 B2 | 10/2003 | Ptasinski et al. | |
| 6,642,719 B1 | 11/2003 | Seto | |
| 6,704,629 B2 | 3/2004 | Huang | |
| 6,737,831 B2 | 5/2004 | Champlin | |
| 2004/0062119 A1 | 4/2004 | Stimak et al. | |
| 2005/0138071 A1 * | 6/2005 | Goodman et al. | 707/104.1 |
| 2005/0156603 A1 | 7/2005 | Lin et al. | |
| 2005/0259460 A1 * | 11/2005 | Sone | 365/145 |
| 2007/0126400 A1 * | 6/2007 | Benckenstein et al. | 320/119 |
| 2007/0190369 A1 * | 8/2007 | Leach et al. | 429/9 |

* cited by examiner

*Primary Examiner* — Arun Williams
(74) *Attorney, Agent, or Firm* — Mitchell K. McCarthy; McCarthy Law Group (57) ABSTRACT

An apparatus is provided with a system load and a plurality of batteries that are individually selectable to provide power to the load, and arbitration circuitry configured to selectively calibrate each of the batteries in relation to respective calibration status data stored in memory for each of the batteries. The arbitration circuitry executes a method for comparing charging records of each of the plurality of batteries, and then instigating a battery power calibration procedure to a selected battery of the plurality of batteries in relation to results of the comparing step.

20 Claims, 8 Drawing Sheets

ENC - Battery 1 Calibration Record 0:
ENC - Cal Date:   Tue Apr 11 2006 18:41:48
ENC - Capacity:   28223 (0x6E3F) mw/hr
ENC - Cal Time:   292 minutes
ENC - Cal Status: 0xCD

ARBITRATING BATTERY POWER CALIBRATION IN A DEVICE THAT SELECTS A BATTERY POWER UNIT FROM A PURALITY OF SELECTABLE BATTERY POWER UNITS

FIELD OF THE INVENTION

The claimed invention relates generally to the field of electrical circuitry and more particularly, but not by way of limitation, to an apparatus and method for arbitrating the calibration of multiple batteries in a system.

BACKGROUND

To operate properly, electrical circuitry often requires a continuous supply of electrical energy. The energy can be provided from a source at one or more nominal voltage levels (e.g., +3.3 volts, v), and current is drawn at these respective voltage levels. The circuitry can operate in a variety of modes each having different associated levels of energy consumption.

A refreshed circuit device includes an operational mode and a refresh mode, with the operational mode relating to its operational interaction with other circuitry and the refresh mode relating to actions taken place to maintain the device in a given state. For example, dynamic random access memory (DRAM) provides an array of storage cells that store electrical charge in order to serve as a memory space for digital data. Data are read from and written to the various cells to carry out a data transfer operation with other circuitry.

Because the storage cells lose the stored charge at a given decay rate (i.e., the storage cells in a DRAM can be characterized as leaky capacitors), a self-refresh operation is carried out in the background in order to maintain the device in the then-existing logical state. During the self-refresh operation, the device reads the state of the array and then rewrites that same state to the various storage cells in the array. In this way, the charge in the various storage cells is continually refreshed at a rate faster than the rate at which charge decays from the cells.

It follows that the state of a refreshed device will generally be lost once the application of electrical power to the device is interrupted. There is therefore a continued need for improvements in the art for providing sufficient and reliable backup power from a battery or other standby source to maintain the then-existing state until normal system operation can be restored. It is to these improvements that the embodiments of the present invention are directed.

SUMMARY OF THE INVENTION

Preferred embodiments of the present invention are generally directed to an apparatus and associated method for arbitrating calibration of redundant batteries.

In some embodiments a method is provided for comparing charging records of each of a plurality of batteries that are alternatively selectable to provide power in a system, and instigating a battery power calibration procedure to a selected battery of the plurality of batteries in relation to results of the comparing step.

In some embodiments an apparatus is provided with a system load and a plurality of batteries that are individually selectable to provide power to the load, and software controlled arbitration circuitry configured to selectively calibrate each of the batteries in relation to respective calibration status data stored in memory for each of the batteries.

In some embodiments a data storage system is provided with an array of data storage devices operable via a selectable battery from a plurality of redundant batteries, and means for arbitrating power calibration of the batteries to maintain at least one battery in service to power the array at all times.

These and various other features and advantages which characterize the claimed invention will become apparent upon reading the following detailed description and upon reviewing the associated drawings.

DETAILED DESCRIPTION

Figure 1:
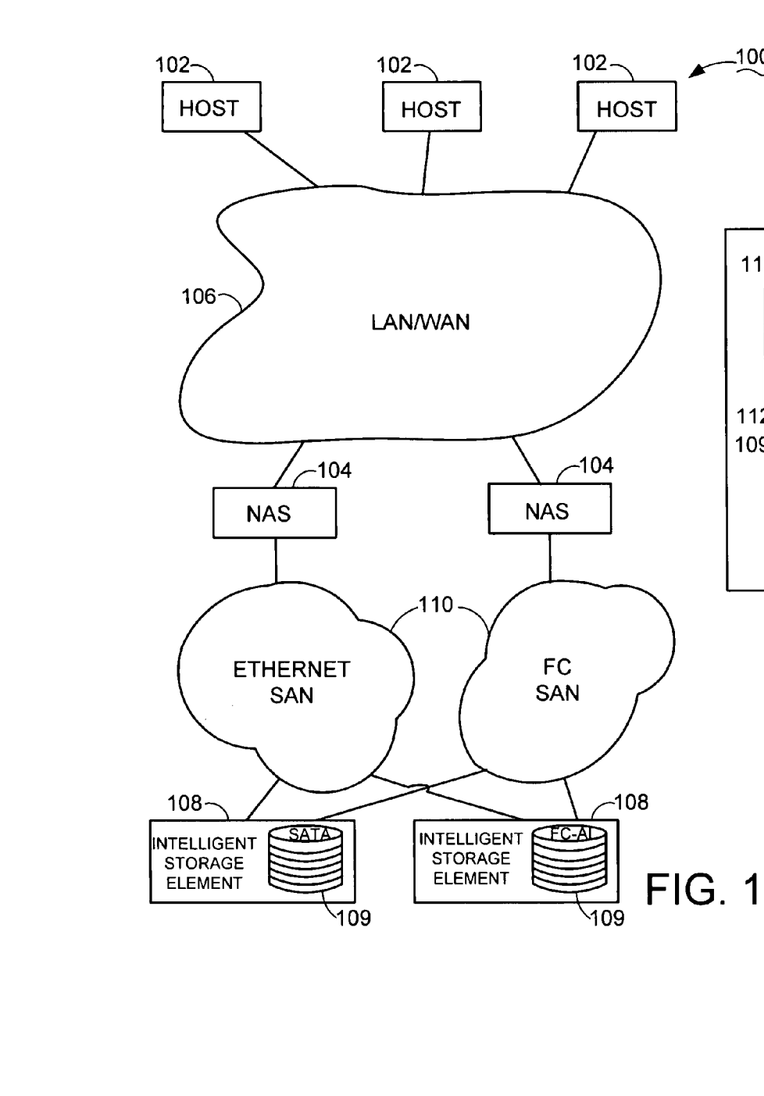
FIG. 1 is a diagrammatic representation of a computer system in which embodiments of the present invention are useful.

FIG. 1 is an illustrative computer system 100 in which embodiments of the present invention are useful. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent storage elements ("ISEs") 108. Accordingly, SANs 110 connect the servers 104 to the ISEs 108 for access to the stored data. The ISEs 108 provide blocks of data storage capacity 109 for storing the data over various selected communication protocols such as serial ATA and fibre-channel, with enterprise or desktop class storage medium within it.

Figure 2:
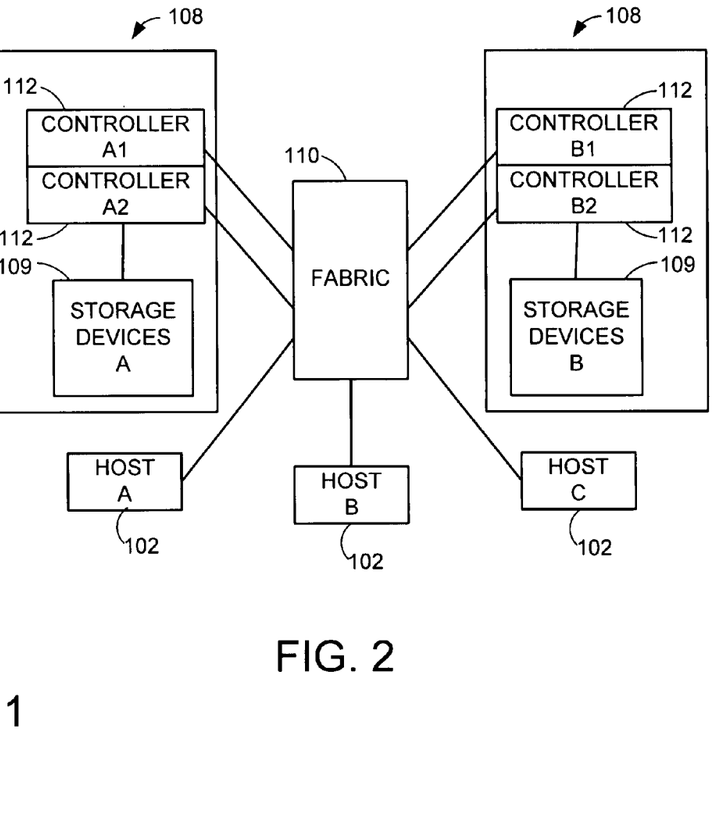
FIG. 2 is a simplified diagrammatic representation of a portion of the computer system of FIG. 1.

FIG. 2 is a simplified diagrammatic view of a portion of the computer system 100 of FIG. 1. The hosts 102 interact with each other as well as with a pair of the ISEs 108 (denoted A and B, respectively) via the network or fabric 110. Each ISE 108 includes dual redundant controllers 112 (denoted A1, A2 and B1, B2) preferably operating on the data storage capacity 109 as a set of data storage devices characterized as a redundant array of independent drives (RAID). The controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

It is further contemplated that the A host computer 102 and the A ISE 108 can be physically located at a first site, the B host computer 102 and B ISE 108 can be physically located at a second site, and the C host computer 102 can be yet at a third site, although such is merely illustrative and not limiting. All entities on the distributed computer system are connected over some type of computer network.

Figure 3:
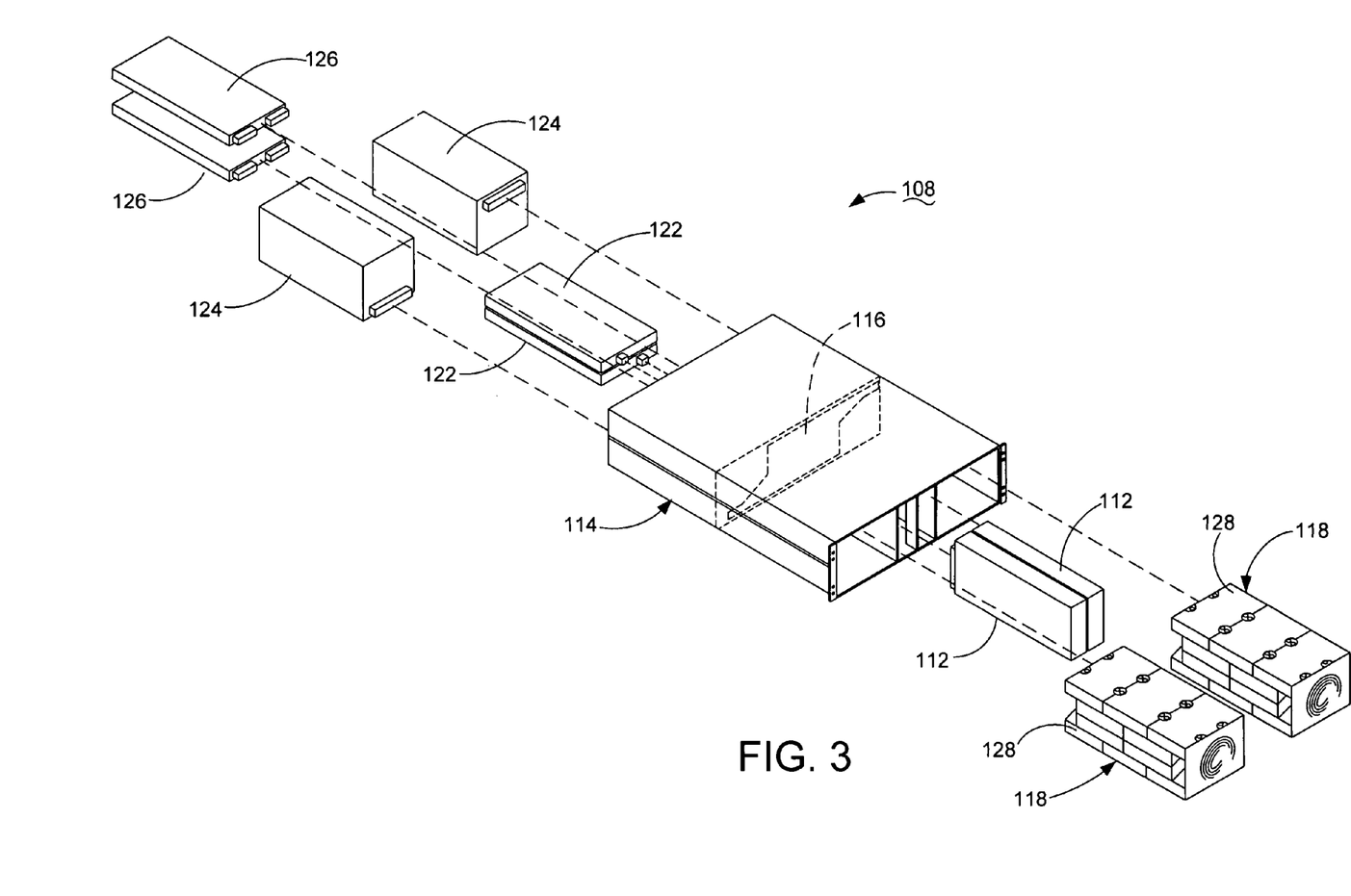
FIG. 3 is an exploded isometric view of an intelligent storage element constructed in accordance with embodiments of the present invention.

FIG. 3 illustrates an ISE 108 constructed in accordance with embodiments of the present invention. A shelf 114 defines cavities for receivingly engaging the controllers 112 in electrical connection with a midplane 116. The shelf 114 is supported, in turn, within a cabinet (not shown). A pair of multiple disc assemblies (MDAs) 118 are receivingly engageable with the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

Figure 4:
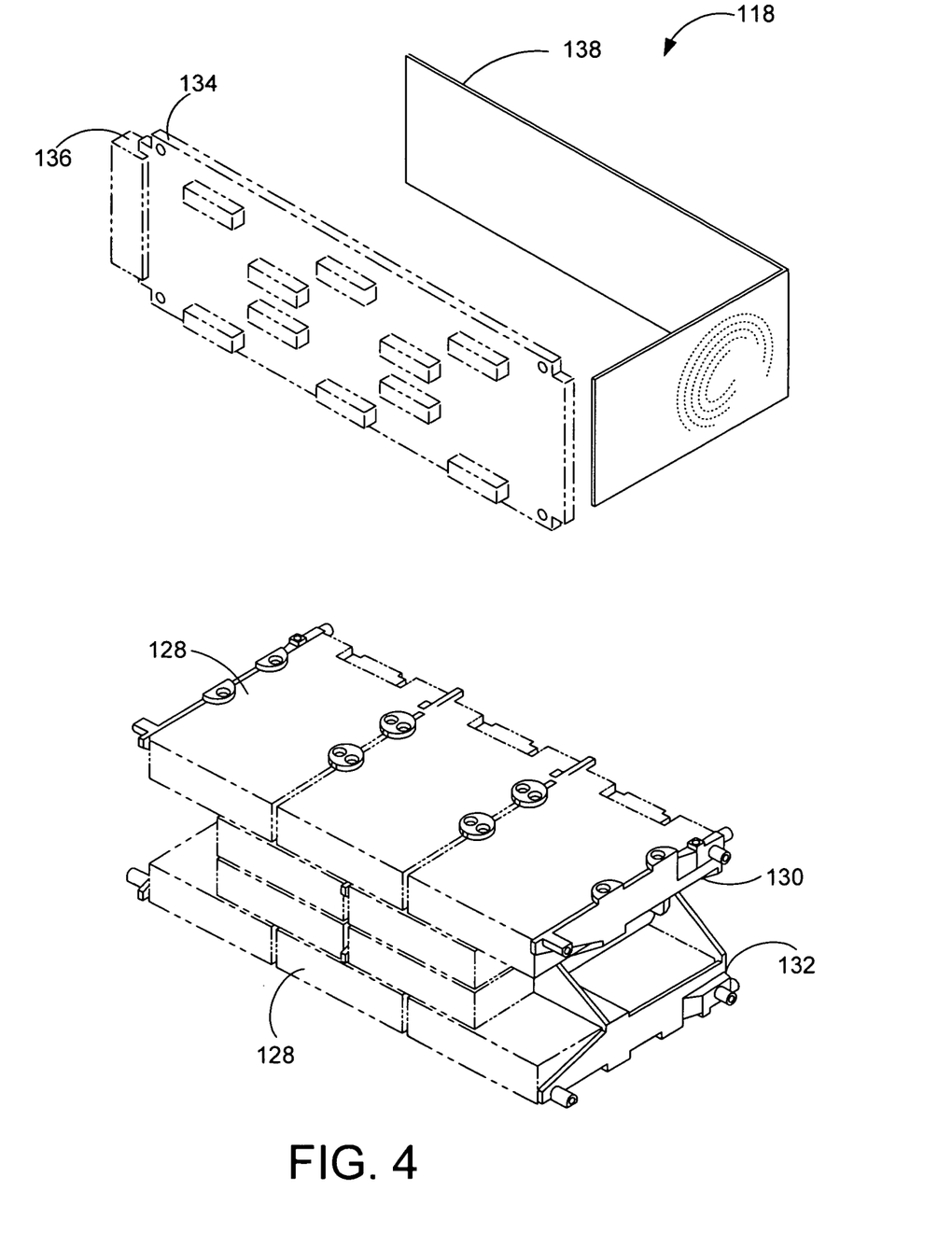
FIG. 4 is a partially exploded isometric view of a multiple disc array of the intelligent storage element of FIG. 3.

FIG. 4 is an enlarged partially exploded isometric view of an MDA 118 constructed in accordance with some embodiments of the present invention. The MDA 118 has an upper partition 130 and a lower partition 132, each supporting five data storage devices 128. The partitions 130, 132 align the data storage devices 128 for connection with a common circuit board 134 having a connector 136 that operably engages the midplane 116 (FIG. 3). A wrapper 138 provides electromagnetic interference shielding. This illustrative embodiment of the MDA 118 is the subject matter of patent application Ser. No. 10/884,605 entitled Carrier Device and Method for a Multiple Disc Array which is assigned to the assignee of the present invention and incorporated herein by reference. Another illustrative embodiment of the MDA is the subject matter of patent application Ser. No. 10/817,378 of the same title which is also assigned to the assignee of the present invention and incorporated herein by reference. In alternative equivalent embodiments the MDA 118 can be provided within a sealed enclosure and holding an inert atmosphere.

Figure 5:
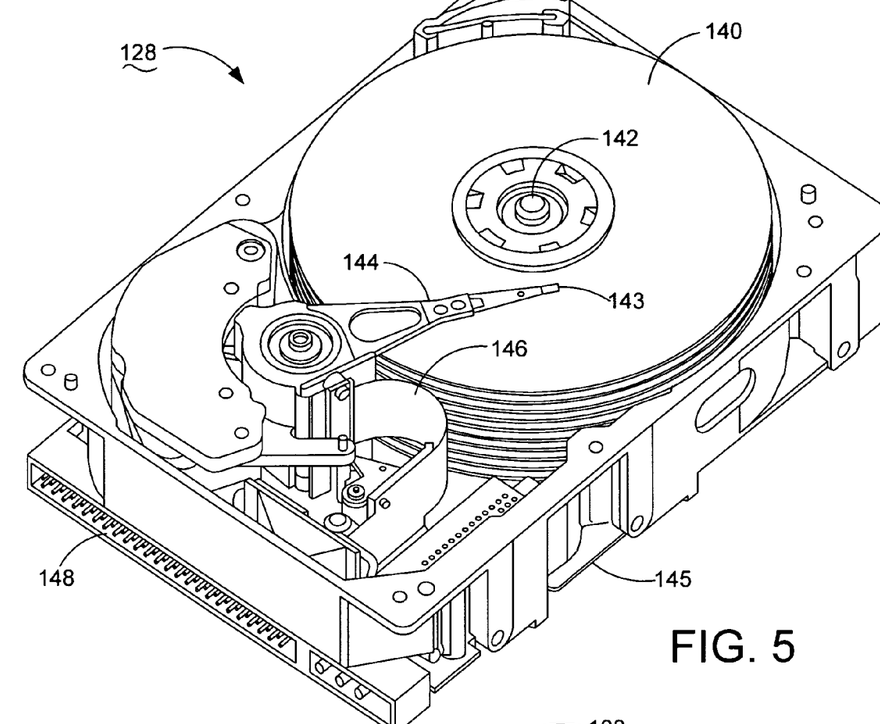
FIG. 5 is an exemplary data storage device used in the multiple disc array of FIG. 4.

FIG. 5 is an isometric view of an illustrative data storage device 128 suited for use with embodiments of the present invention and in the form of a rotating media disc drive. Although a rotating spindle with moving data storage medium is used for discussion purposes below, in alternative equivalent embodiment a non-rotating medium device, such as a solid state memory device is used. A data storage disc 140 is rotated by a motor 142 to present data storage locations of the disc 140 to a read/write head ("head") 143. The head 143 is supported at the distal end of a rotary actuator 144 that is capable of moving the head 143 radially between inner and outer tracks of the disc 140. The head 143 is electrically connected to a circuit board 145 by way of a flex circuit 146. The circuit board 145 is adapted to receive and send control signals controlling the functions of the data storage device 128. A connector 148 is electrically connected to the circuit board 145, and is adapted for connecting the data storage device 128 with the circuit board 134 (FIG. 4) of the MDA 118.

Figure 6:
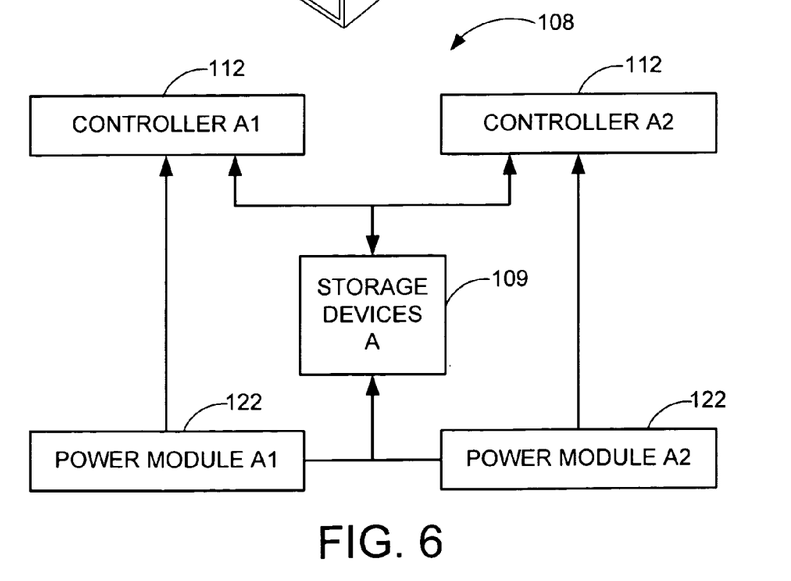
FIG. 6 illustrates the general architecture of a selected one of the data storage arrays of FIG. 1.

As shown in FIG. 6, each ISE 108 includes the pair of controllers 112 (denoted A1/A2) and the set of data storage devices 128 preferably characterized as hard disc drives operated as a RAID. The controllers 112 and devices 128 preferably utilize a fault tolerant arrangement so that the various controllers 112 utilize parallel, redundant links and at least some of the user data stored by the system 100 is mirrored on both sets of devices 128.

Each ISE 108 further includes the pair of power modules 122 (A1/A2) which supply electrical power to the controllers 112 and the storage devices 128. The power modules 122 are preferably configured to operate in tandem so that during normal operation the power module A1 supplies power to the controller A1 and to half of the devices 128, and the power module A2 supplies power to the controller A2 and to the other half of the devices 128. Each power module 122 is further sized and configured to be able to individually supply all of the power for the ISE 108 should the other power module 122 become inoperative or unavailable, such as for calibration purposes as described further below.

Figure 7:
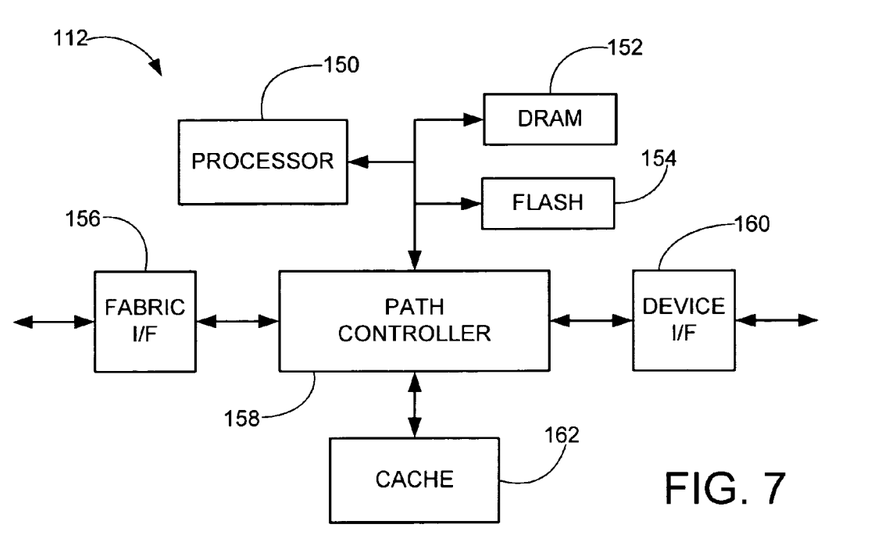
FIG. 7 provides a functional block diagram of a selected one of the controllers of FIG. 2.

FIG. 7 provides a functional diagram of a selected one of the controllers 112 of FIG. 2. A main processor 150 uses programming and data stored in refreshed memory 152 (DRAM) and non-volatile memory (flash) 154 to provide top level control. A communication path is provided by a fabric interface (I/F) block 156, a path controller 158 and a device interface (I/F) block 160.

A refreshed cache memory device 162 provides a memory space for the temporary storage of data being transferred between the host computers 102 and the storage devices 128. For reference, the cache 162 is preferably characterized as one or more DRAM modules having a total selected storage capacity (such as 1.024 gigabytes, GB).

Figure 8:
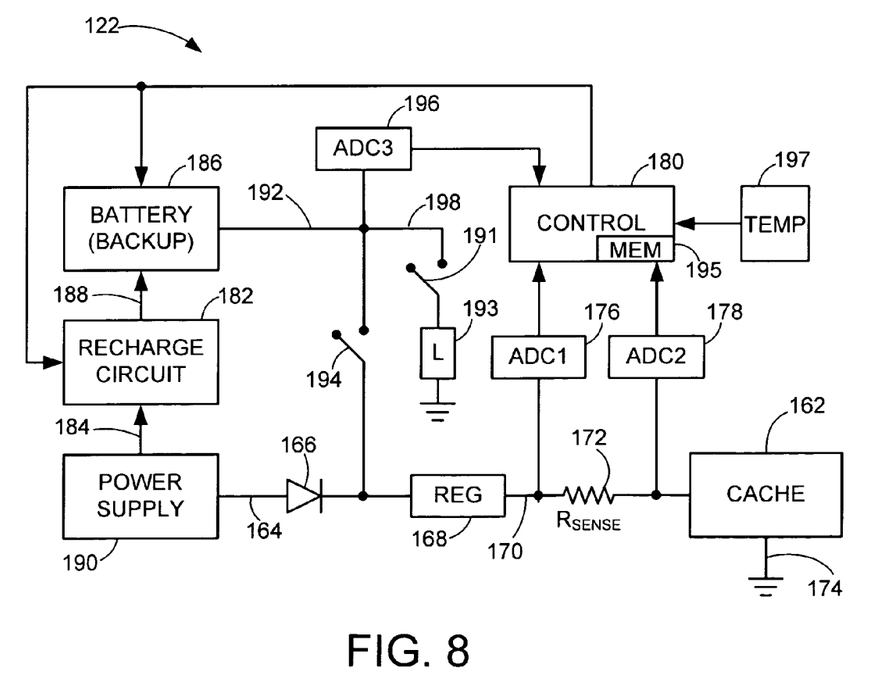
FIG. 8 illustrates relevant portions of one of the power modules of FIG. 6 constructed and operated in accordance with preferred embodiments of the present invention to supply operational and backup power to the cache memory of the controller of FIG. 2.

FIG. 8 shows relevant portions of a selected one of the power modules 122 of FIG. 6. It will be understood that FIG. 8 is generally directed to that portion of the module 122 that provides operational and standby (backup) power to the cache 162.

A power supply 190 operates to receive input AC power from a domestic source (not shown) and output various associated DC voltages on different supply paths, such as the path 164 which is provided at nominally 12V.

This voltage is supplied through protection diode 166 to a regulator 168 which applies voltage regulation to provide an output regulated voltage to path 170. The regulated voltage passes through a current sense resistor (RSENSE) 172 and then to the cache 162. Ground connection 174 denotes the completion of this main power supply loop.

A pair of analog to digital converters 176, 178 (denoted as ADC1, ADC2) are arranged on opposing sides of the sense resistor 172 as shown to provide digital indications of the voltage drop across the resistor to a control block 180. The control block 180 can comprise hardware or a software/firmware routine, as desired.

Continuing with the circuitry of FIG. 8, a battery recharge circuit 182 receives input voltage from the power supply via path 184 to selectively apply recharging current to a battery 186 (or other backup power source) via path 188. As discussed below, the battery 186 is configured to supply standby (backup) power to the cache 162 during an anomalous condition (i.e., failure of the power supply 190) to maintain the cache 162 in a continuous self-refresh mode, thereby allowing the cache 162 to save the then-existing contents stored therein until appropriate remedial corrective actions can be taken.

The battery 186 supplies an output voltage (such as on the order of 4-6 volts) on path 192. During normal operation, path 192 is preferably coupled to path 164 (i.e., switching element 194 is closed) so that the regulator receives power from both the power supply 190 and the battery 186. This advantageously assures that should the power supply 190 be interrupted, power will continue to flow to the cache 162. The switching element 194 can comprise a suitable transistor, one or more protection diodes, etc., as desired.

A third analog to digital converter 196 (ADC3) is coupled to the path 192 as shown, and provides a digital representation of the voltage on path 192 to the control block 180. A shunt path 198 also extends from the path 192 to provide a switching element 191 and a load (L) 193. As described functionally below, the circuitry of FIG. 8 provides an apparatus with a plurality of batteries 186 that are individually selectable to provide power to the load 193, and arbitration circuitry in the control 180 configured to selectively calibrate each of the batteries in relation to respective calibration status data stored in memory 195 for each of the batteries.

For example, the software controlled arbitration circuitry executed in the control 180 can be configured to selectively calibrate the batteries 122 (FIG. 3) in relation to a hierarchy of calibration statuses from a set consisting of a calibration done status ("CAL_DONE"), a calibration active status ("CAL_ACTIVE"), a calibration pending status ("CAL_PENDING"), a calibration failed status ("CAL_FAIL"), or possibly an internal state of unknown calibration. Preferably, the arbitration circuitry requires at least one battery having a CAL_DONE status before relinquishing another battery for calibration purposes.

Finally, FIG. 8 shows a temperature sensor (TEMP) 197 located in a suitable location to obtain ambient operational temperature readings and provide digital representations thereof to the control block 180.

Preferred operation of the circuitry of FIG. 8 will now be discussed with respect to FIG. 9, which provides a flow chart of steps for a battery power CALIBRATION routine 200. The routine 200 is preferably carried out at appropriate times during the operational life of the system 100 in order to assess the then-existing individual standby power capacity of each of the batteries 122. By calibrating the observed capacity (sometimes referred to more generally as an "operational attribute") against a standard (sometimes referred to more generally as a "predetermined fixed threshold"), failure modes can be predicted and appropriate remedial actions taken preemptively to effectively maintain system availability at the requisite levels. That is, the present embodiments contemplate storing calibration records in non-volatile memory in order to retain a historical record indicative of tapering characteristics of the battery. For example, without limitation, as a battery ages its calibrated capacity decreases. Therefore, based on observing the trending data for calibrated capacity, a battery could be scheduled for replacement before it fails, and while it still has enough capacity to support the cache.

It will be noted that some battery chemistries, such as lithium-ion and other lithium based chemistries require precise charging and discharging schemes, known generally as "controlled charging" and "controlled discharging" schemes. Inadequate charging and discharging rates can create conditions such as excessive heat build-up and excessive overcharged and/or overdischarged conditions. These conditions and build-ups can cause irreversible damage to the batteries, severely impacting the battery's capacity. Excessive heat can, for example, cause one or more cells within the battery to become imbalanced, severely impacting the performance of the battery output, capacity, and life.

The method 200 begins at step 202 with the circuitry of FIG. 8 operating to charge the battery 186 to full capacity in a controlled manner, requiring an extended period of time (usually several hours). When the battery 186 is fully charged, control then passes to block 204 where the battery 186 is then discharged through the load 193, again usually in a controlled manner over an extended period of time. It will be recognized that during this discharge operation, the battery 186 will generally not be available to supply standby power to the cache 162; however, as discussed above the preferred configuration of each ISE 108 provides redundant power modules 122. Step 202 thus further preferably comprises affirmatively arranging the battery backup capability of the other module 122 to cover for the cache 162 if such operation is not already an automatic feature of the system 100.

During the discharge operation, the battery recharging operation from circuit 182 is temporarily suspended, the connection between path 192 and path 164 is broken (e.g., normally closed switching element 194 is opened), connection is made with the load 193 (e.g., normally open switching element 191 is closed), and the ADC3 196 is configured to monitor the voltage from path 192.

Figure 10:
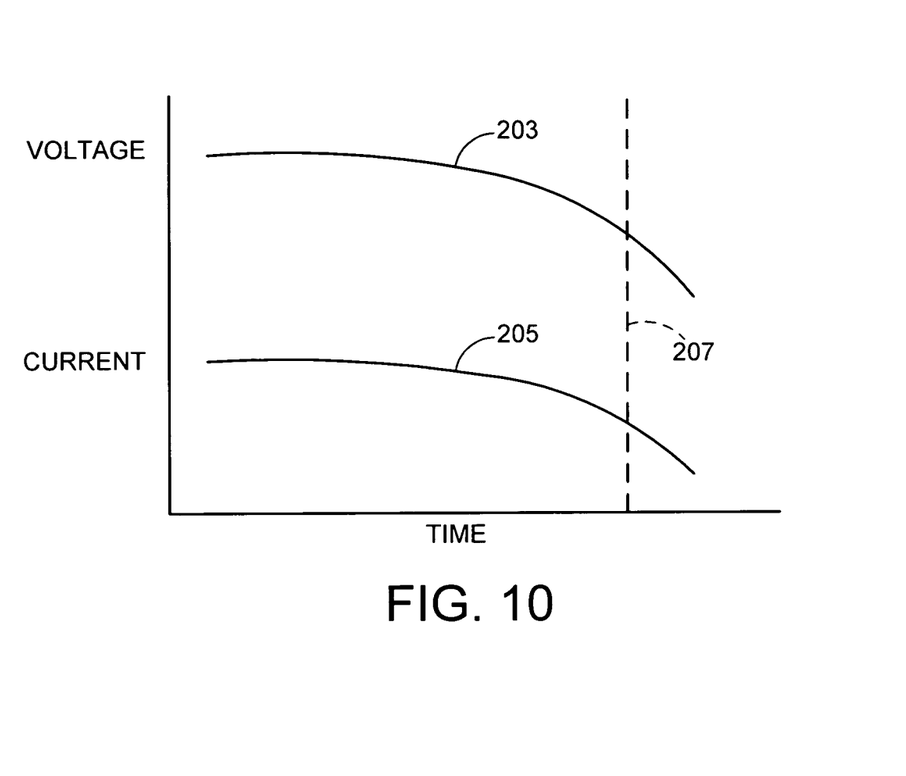
FIG. 10 provides voltage and current decay curves obtained during discharge of the battery during calibration.

In the illustrated embodiments the time required for a discharge of energy from the battery 186 to reach a preselected end-of-discharge (EOD) voltage is compared to a predetermined window of time. That is, during the controlled discharge the battery 186 is deemed to have passed calibration if the EOD voltage is reached after a predetermined lower threshold ($t_L$) time and before a predetermined upper threshold of time ($t_U$). Since the nominal impedance of the load 193 is known, the readings from the ADC3 196 enable the control block 180 to generate voltage and current decay curves to show the characteristic decay in these levels during the energy discharge operation. Representative voltage and current decay curves are depicted at 203 and 205 in FIG. 10.

Figure 9:
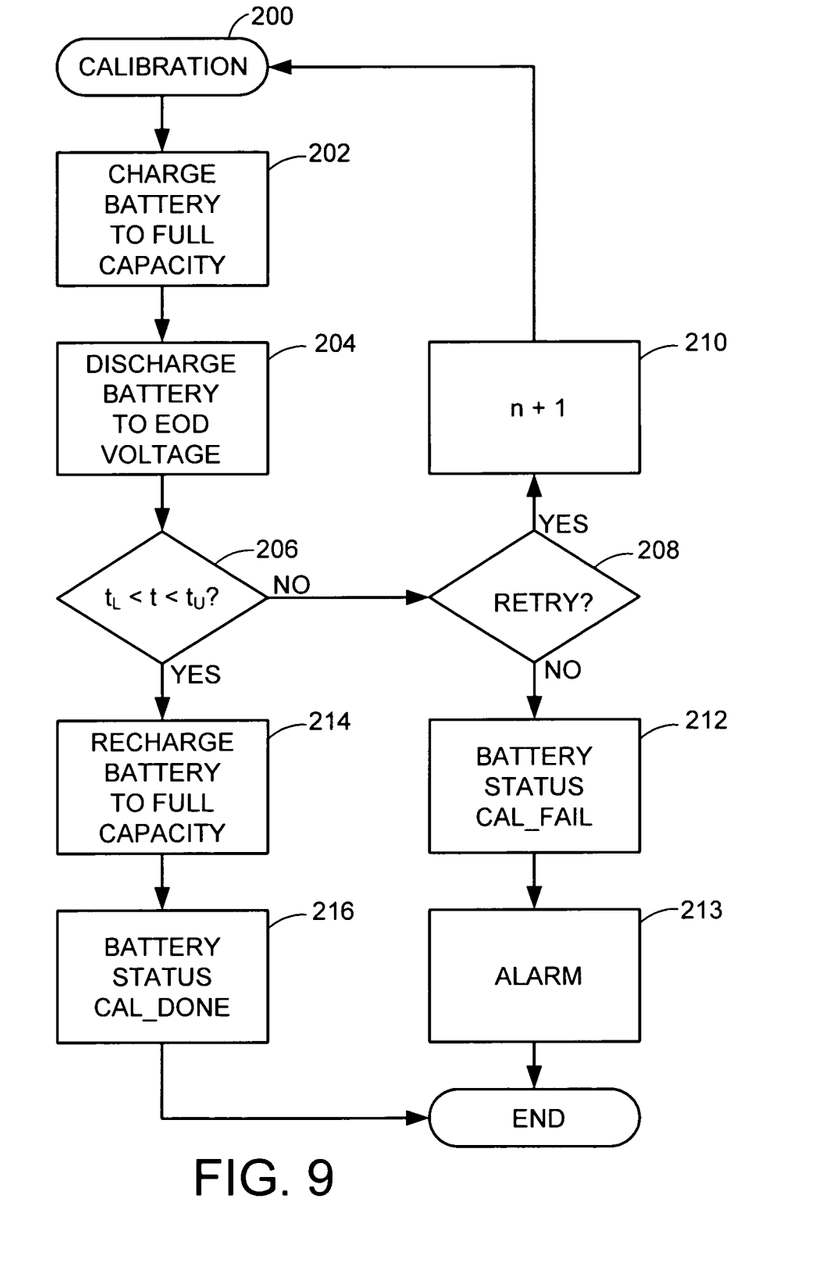
FIG. 9 is a flowchart of steps in a method for CALIBRATION of a battery in accordance with illustrative embodiments of the present invention.

It will be noted that the embodiments of FIG. 9 and the description herein of calibration techniques are illustrative and not limiting of the embodiments of the present invention. For example, in other equivalent alternative embodiments the actual energy consumption of the cache 162 is under consideration in the calibration technique, such as is described in copending U.S. application Ser. No. 10/884,601 entitled Assessing Energy Requirements for a Refreshed Device, which is assigned to the assignee of the present application and incorporated in its entirety herein. An enumeration of all possible calibration techniques contemplated herein is not necessary for a skilled artisan to understand the scope of the present embodiments, and as such no partial enumeration is necessary or attempted.

It will also be noted that the controlled discharge of the battery 186 of step 204 provides other benefits as well. Depending on the battery construction, the operational life of the rechargeable battery 186 can be advantageously extended by the periodic full discharge of accumulated charge.

Also, the cache 162 has a minimum voltage input level requirement in order to be able to successfully carry out the refresh operation. In such case, the energy available from the battery 186 at voltages below this value (i.e., to the right of broken line 207 in FIG. 10) are likely insufficient to enable the cache 162 to continue self-refresh operation. As discussed previously, the data obtained during step 204 thus further provides valuable information with regard to the tapering characteristics of the battery output, and allows an accurate assessment of the actual energy available to provide standby power to the cache 162 (i.e., those portions of the curves 203, 205 to the left of line 207).

Figure 11:
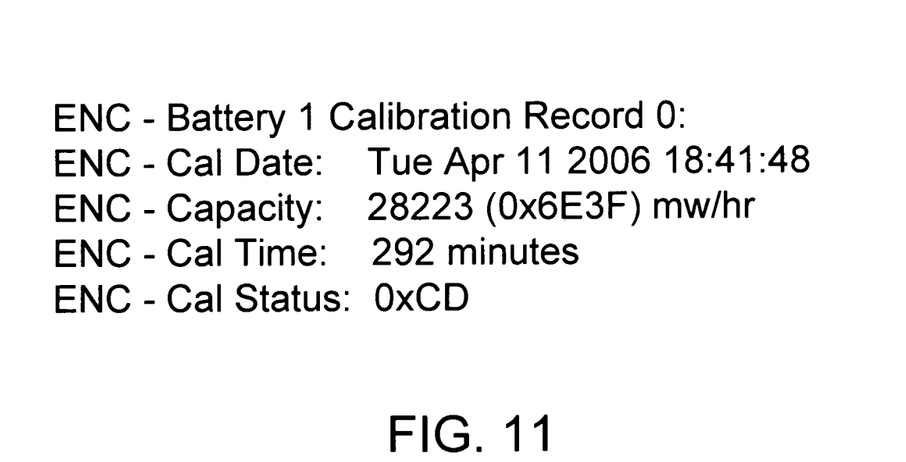
FIG. 11 is a table of battery data stored in memory.

In block 206 it is determined whether the EOD voltage was reached within the predetermined window between $t_L$ and $t_U$. If the determination of block 206 is no, then control passes to block 208 where it is determined whether a retry of the failed calibration process is to be attempted. If so, then in block 210 a counter n (number of trials) is incremented, and control returns to block 202. If the determination of block 208 is no, then in block 212 the status of the battery 186 is recorded in memory 195 as being CAL_FAIL and the software management layer is notified in block 213. FIG. 11 illustrates a sample charge record stored in memory 195, wherein battery 1 is identified as having a status of CAL_FAIL, with a timestamp associated with when that status determination was made, and with calibrated capacity and calibration time data.

Returning to FIG. 9, if the determination of block 206 is yes, then in block 214 the battery 186 is subjected to another controlled charging process, which again can take an extended period of time during which the battery 186 remains unavailable to the system 100. Particularly, the load 193 is disconnected from the battery 186 and the recharge circuit 182 is activated to begin recharging the battery 186. Once fully charged, the status of the battery 186 is recorded in memory 195 as being CAL_DONE in block 216.

The routine 200 is preferably configured to be performed automatically on an ongoing basis, as well as manually carried out by system administrator personnel at appropriate times as accessed through one of the hosts 102. The resulting data, including actual measurements, curves and trends can likewise be reported via the hosts.

Figure 12:
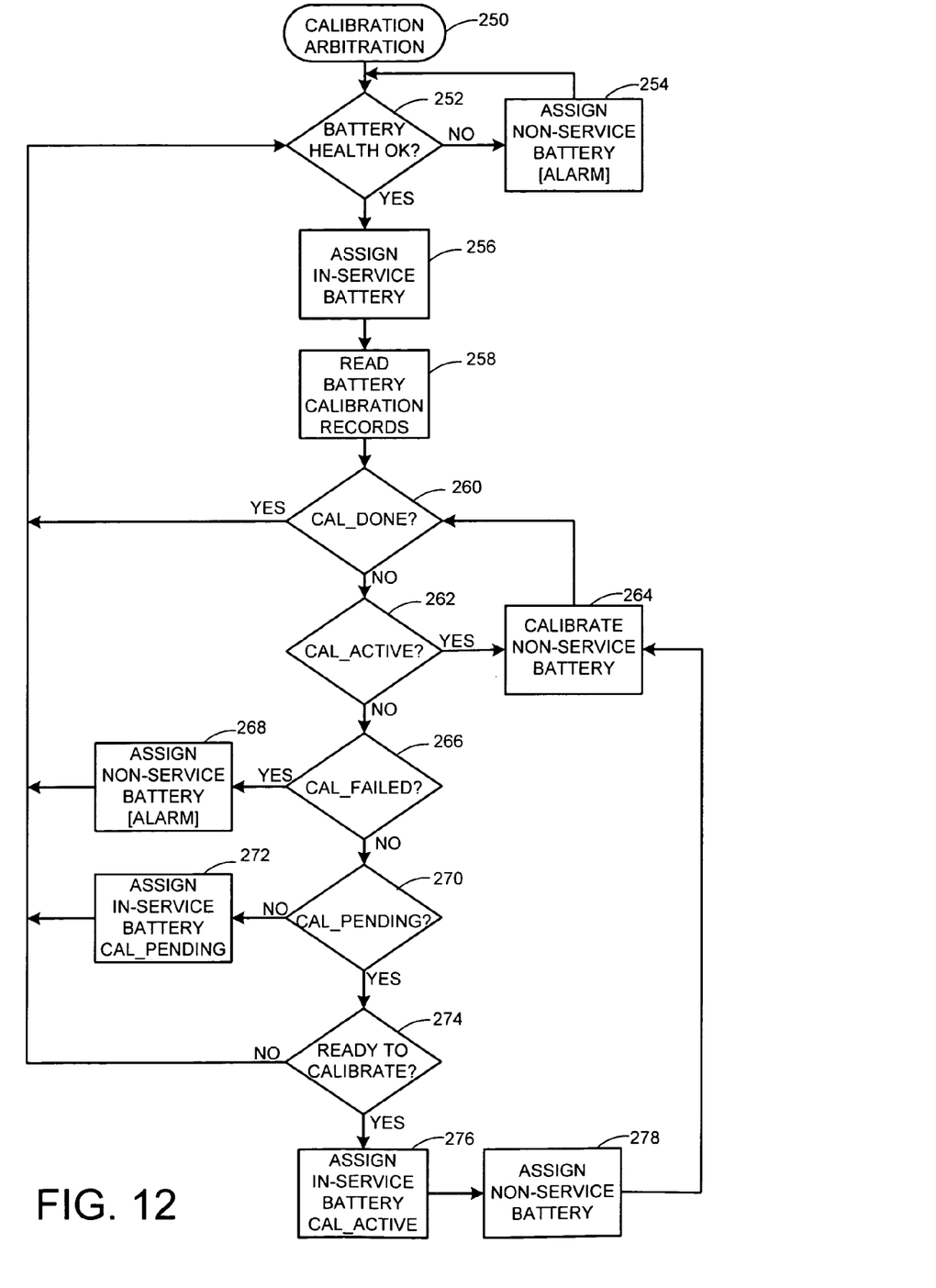
FIG. 12 is a flowchart of steps in a method of ARBITRATING CALIBRATION in accordance with embodiments of the present invention.

FIG. 12 is a flowchart showing illustrative steps of a method 250 for ARBITRATING CALIBRATION in accordance with embodiments of the present invention. Ideally, the method 250 is sequenced periodically for all batteries in the system, such as once every minute. The method 250 functions as a hierarchical scrutiny of each battery 186 status in order to arbitrate which battery or batteries qualify as candidates for in-service duty and which one, if any, should be calibrated next. Beginning in block 252, the health of all the batteries 186 is checked. Batteries 186 that fail the health screen are assigned to non-service status in block 254, and an alarm is preferably sent to the software management layer which can memorialize the alarm condition in an event log. Batteries 186 that pass the health screen form a pool from which an in-service battery 186 is assigned in block 256.

Control then passes to block 258 where the battery records are read from the memory 195. If it is determined in block 260 that all the batteries are reporting a CAL_DONE status then control returns to block 252 and no arbitration is necessary. However, any battery not reporting a CAL_DONE status is then checked as to whether it is reporting a CAL_ACTIVE status in block 262. If yes, then it is assigned to a non-service duty and selected for calibration in block 264. It will be noted, however, that the method 250 will not proceed with calibrating a battery 186 until all batteries have passed the health screen.

Having selected the non-service battery for calibration, control then passes to block 266 where it is determined whether any battery is reporting a CAL_FAILED status. If so, that battery is assigned to non-service duty and an alarm condition is triggered in block 268 as above. Control then passes to block 270 where it is determined whether any battery is reporting the CAL_PENDING status. Any battery not reporting CAL_PENDING at this stage of the hierarchical sequence is of an unknown status, such as would be the case of a new battery without any charge records yet. Such batteries are assigned to in-service duty and CAL_PENDING status in block 272. Finally, in block 274 it is determined whether any of the batteries are ready to calibrate. If no, control returns to block 252; otherwise, another battery is assigned to in-service duty in block 276 and the designated battery is assigned to non-service duty in block 278 and then calibrated in block 264.

While preferred embodiments have been directed to the use of a DRAM as the associated refresh device, such is merely illustrative and not limiting; rather, the foregoing embodiments can be readily adapted for use with any number of different types of devices that employ a charge refresh operation such as capacitive or inductive arrays; plasma, LCD or other types of displays, etc.

Summarizing generally, the present embodiments contemplate a method (such as 250) for comparing charging records (such as 262) of each of a plurality of batteries (such as 186) that are alternatively selectable to provide power in a system, and instigating a battery power calibration procedure (such as 264) to the batteries in relation to results of the comparing step.

In some embodiments the comparing step is characterized by storing data associated with charging the batteries to memory (such as 195) to form the charging records, and subsequently retrieving the charging records from the memory. The charging records stored in memory can include any useful information, such as a power calibration status and a time stamp associated with the power calibration status. The power calibration status can designate a done status, indicating a battery that has successfully been calibrated. Alternatively, a battery currently being calibrated can indicate a power calibration status of active. A battery that has been identified as being in need of calibration, but not yet begun, can be identified as having a power calibration status of pending. A battery that has previously failed a calibration procedure can have a power calibration status of failed. If a battery status is not identifiable by any of these categories then it is of an internal state best described as an unknown status. A new battery with no charge records, for example, would quickly be assigned a CAL_PENDING status to ensure it gets charged and calibrated as quickly as possible.

The method determines when a battery needs to be calibrated, and determines which battery to calibrate first when two or more need calibration. Preferably, the backup integrity of the system is maintained by not relinquishing a battery for calibration unless another battery is reporting a done status. If no battery exists reporting a done status, or if a battery fails the calibration sequence, then the method can signal an alarm to the management layer of the software and note the circumstances in an event log.

In some embodiments the method is carried out by an intelligent storage element (such as 108) in a distributed storage system.

The present embodiments alternatively characterized include an apparatus with a system load (such as 193) and a plurality of batteries that are individually selectable to provide power to the load, and software controlled arbitration circuitry (such as 180) configured to selectively calibrate each of the batteries in relation to the respective calibration status data stored in memory for each of the batteries. The arbitration circuitry is configured to selectively calibrate the batteries in relation to a hierarchy of the calibration statuses.

In some embodiments a data storage system is provided with an array of data storage devices (such as 108) operable via a selectable battery from a plurality of redundant batteries, and means for arbitrating power calibration of the batteries to maintain at least one battery in service to power the array at all times. For purposes of this description and meaning of the appended claims, the phrase "means for arbitrating" expressly requires circuitry as described herein that compares the present status of two or more batteries in order to arbitrate the calibration sequence when more than one battery is in need of the calibration. The comparison provides a multiple level hierarchical scheme for designating which battery to calibrate first among a plurality in need of calibration.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. A method comprising:
   processing instructions stored in a computer readable memory that are executable for comparing charging records of each of a plurality of batteries that are individually useable to provide power to
   an electronic component further processing the instructions to select one of the batteries based on the comparing; further processing the instructions to electrically isolate the selected battery from all of the other batteries in the plurality and from the electronic component while still providing power to the electronic component from a source other than the selected battery; and
   further processing the instructions to instigate a battery power calibration procedure in relation to a hierarchy of calibration statuses ranging from a done status at the top of the hierarchy to a failed status at the bottom of the hierarchy and one or more other statuses in the hierarchy, the calibration procedure characterizing the selected battery as being calibrated or not calibrated by determining a time required to discharge the selected battery to a system load from a fully charged voltage to a preselected end-of-discharge voltage and comparing the determined discharge time to a predetermined fixed time range.

2. The method of claim 1 wherein the comparing step is characterized by storing data associated with charging the batteries to memory and subsequently retrieving the data from the memory.

3. The method of claim 2 wherein the comparing step is characterized by data that indicate a power calibration status for each battery.

4. The method of claim 3 wherein the comparing step is characterized by data that indicate a time stamp associated with each calibration status.

5. The method of claim 1 wherein the comparing step is characterized by data that indicate a power calibration status of done.

6. The method of claim 1 wherein the comparing step is characterized by data that indicate a power calibration status of active.

7. The method of claim 1 wherein the comparing step is characterized by data that indicate a power calibration status of pending.

8. The method of claim 1 wherein the comparing step is characterized by data that indicate a power calibration status of failed.

9. The method of claim 1 wherein the comparing step is characterized by data that indicate an unknown calibration status.

10. The method of claim 1 wherein the comparing step is characterized by determining when a battery needs to be calibrated.

11. The method of claim 1 wherein the comparing step is characterized by determining which battery is calibrated first when two or more batteries need to be calibrated.

12. The method of claim 1 wherein the comparing step is characterized by identifying at least one battery exists with a power calibration status of done before calibrating another battery.

13. The method of claim 1 wherein the comparing step is characterized by signaling a system alarm when no battery exists with a battery power calibration status of done.

14. The method of claim 1 wherein the comparing step is characterized by signaling a system alarm when a battery power calibration status is failed.

15. An intelligent storage element apparatus in a distributed storage system configured to carry out the method of claim 1.

16. An apparatus comprising:
   an electronic component; a plurality of batteries that are individually useable to provide power to the electronic component; arbitration circuitry configured to selectively calibrate each of the plurality of batteries in relation to a hierarchy of calibration statuses ranging from a done status at the top of the hierarchy to a failed status at the bottom of the hierarchy and one or more other statuses in the hierarchy, the calibration procedure characterizing a selected battery as being calibrated or not calibrated by determining a time required to discharge the selected battery to a system load from a fully charged voltage to a preselected end-of-discharge voltage and comparing the determined discharge time to a predetermined fixed time range, the selected battery determined in relation to respective calibration status data stored in memory for each of the plurality of batteries; and isolation circuitry that electrically isolates the selected battery from all other batteries in the plurality of batteries and from the electronic component during the calibration of the selected battery, and supplying the electronic component with power from another source during the calibration of the selected battery.

17. The apparatus of claim 16 wherein
   the hierarchy of calibration statuses includes at least one of a calibration done status, a calibration active status, a calibration pending status, and a calibration failed status.

18. The apparatus of claim 16 wherein the arbitration circuitry is configured to calibrate a battery only if another battery exists with a calibration done status.

19. The apparatus of claim 16 wherein the arbitration circuitry resides in an intelligent storage element of a distributed storage system.

20. A data storage system comprising:
   a memory; a plurality of batteries that are individually useable to provide power to the memory; arbitration circuitry configured to selectively calibrate each of the plurality of batteries in relation to a hierarchy of calibration statuses ranging from a done status at the top of the hierarchy to a failed status at the bottom of the hierarchy and one or more other statuses in the hierarchy, the calibration procedure characterizing a selected battery as being calibrated or not calibrated by determining a time required to discharge the selected battery to a system load from a fully charged voltage to a preselected end-of-discharge voltage and comparing the determined discharge time to a predetermined fixed time range, the selected battery determined in relation to respective calibration status data stored in memory for each of the plurality of batteries; and isolation circuitry that electrically isolates the selected battery from all other batteries in the plurality of batteries and from the memory during the calibration of the selected battery, and supplying the memory with power from another source during the calibration of the selected battery.

* * * * *